(12) United States Patent
Kinpara et al.

(10) Patent No.: US 8,890,387 B2
(45) Date of Patent: Nov. 18, 2014

(54) STATOR AND MOTOR

(75) Inventors: Yoshimasa Kinpara, Toyohashi (JP); Noriyasu Nishio, Kosai (JP); Takahiro Yamamoto, Kosai (JP)

(73) Assignee: Asmo Co., Ltd., Shizuoka-ken (JP)

( * ) Notice: Subject to any disclaimer, the term of this patent is extended or adjusted under 35 U.S.C. 154(b) by 221 days.

(21) Appl. No.: 13/525,860

(22) Filed: Jun. 18, 2012

(65) Prior Publication Data
US 2012/0326552 A1    Dec. 27, 2012

(30) Foreign Application Priority Data
Jun. 21, 2011  (JP) ................................. 2011-137365

(51) Int. Cl.
*H02K 3/12*   (2006.01)
*H02K 1/16*   (2006.01)
*H02K 3/493*  (2006.01)
*H02K 1/27*   (2006.01)

(52) U.S. Cl.
CPC ............... *H02K 1/165* (2013.01); *H02K 3/493* (2013.01); *H02K 1/2746* (2013.01)
USPC ..................... 310/200; 310/216.069; 310/201

(58) Field of Classification Search
CPC ........... H02K 1/165; H02K 3/12; H02K 3/34; H02K 1/16; H02K 5/085
USPC .......... 310/200, 201, 208, 216.069, 214, 215
See application file for complete search history.

(56) References Cited

U.S. PATENT DOCUMENTS

| 6,147,429 | A  | * | 11/2000 | Akemakou et al. | 310/181 |
| 7,132,775 | B2 | * | 11/2006 | Oohashi et al.  | 310/201 |
| 8,058,765 | B2 | * | 11/2011 | Rahman et al.   | 310/201 |
| 2001/0011851 | A1 | * | 8/2001 | Asao et al.    | 310/179 |
| 2010/0026132 | A1 | * | 2/2010 | Ooiwa et al.   | 310/201 |

FOREIGN PATENT DOCUMENTS

JP            11-98788         4/1999

* cited by examiner

*Primary Examiner* — Quyen Leung
*Assistant Examiner* — Naishadh Desai
(74) *Attorney, Agent, or Firm* — Christensen Fonder P.A.

(57) ABSTRACT

An armature core of a stator has an annular portion and a plurality of teeth extending radially from the annular portion. A segment coil is configured by electrically connecting a plurality of segment conductors together. The segment conductors extend axially through slots S, each of which is defined between each adjacent pair of the teeth. Each of the teeth has a width adjustment portion for decreasing a slot width in a direction perpendicular to a radial direction in the radially inward direction.

14 Claims, 5 Drawing Sheets

←— outside in radial direction     inside in radial direction —→

←— outside in radial direction     inside in radial direction —→

← outside in radial direction        inside in radial direction →

← outside in radial direction        inside in radial direction →

STATOR AND MOTOR

BACKGROUND

The present invention relates to a stator having segment coils and a motor including the stator.

A stator described in Japanese Laid-Open Patent Publication No. 11-98788 includes segment coils configured by electrically connecting a plurality of segment conductors together. The segment conductors are segment conductor coils (SC coils). The teeth of the stator are formed such that the slot width, which is the dimension of each slot in a direction perpendicular to the radial direction, becomes uniform in the radial direction. In each of the slots, linear portions of segment conductors are radially aligned. Each of the linear portions has a rectangular cross section. By arranging the segment conductors (the linear portions) regularly in each slot, the space factor of the slot is improved. As a result, the stator ensures a highly efficient motor.

However, as viewed in a cross section perpendicular to the axial direction of the stator, the tooth width, which is the tooth thickness in the direction perpendicular to the radial direction, becomes greater in the radially outward direction. The stator thus increases radial direction dependence of magnetic resistance in each tooth. This excessively increases magnetic resistance, or, in other words, magnetic flux density, at an inner position in the radial direction of the tooth. As a result, the rotor is prevented from smoothly rotating.

Accordingly, it is an objective of the present invention to decrease radial variation of magnetic resistance in teeth in a stator and a motor having segment coils.

SUMMARY

To achieve the foregoing objective and in accordance with one aspect of the present invention, a stator including an armature core and a segment coil is provided. The armature core has an annular portion, which defines an axial direction, a radial direction, and a circumferential direction, and a plurality of teeth extending from the annular portion in the radial direction. A slot is defined between teeth of adjacent pairs of teeth. The segment coil is configured by electrically connecting a plurality of segment conductors together. The segment conductors extend axially through the corresponding slots. The dimension of each slot in a direction perpendicular to the radial direction is defined as a slot width. Each one of the teeth has a width adjustment portion for decreasing the slot width in the radially inward direction.

In this configuration, each of the teeth includes the width adjustment portion, which decreases the slot width in the direction perpendicular to the radial direction in the radially inward direction. This decreases radial variation in magnetic resistance in each tooth compared to, for example, a conventional technique in which the slot width is uniform in the tooth radial direction. As a result, unlike the conventional technique, the magnetic resistance (the magnetic flux density) is prevented from increasing excessively at a radially inner position in the tooth and thus hampering smooth rotation of the rotor.

In accordance with another aspect of the present invention, in the above described stator, the segment conductors are formed using wires having identical cross sections. Each of the segment conductors is formed in a U shape and includes a first linear portion, a second linear portion, and a connecting portion for connecting the first linear portion to the second linear portion. The first linear portion extends through each slot at a circumferential position different from the circumferential position at which the second linear portion extends through the corresponding slot. The first linear portion is arranged in each slot at a radial position different from the radial position at which the second linear portion is located in the slot. The first linear portion is formed to follow the shape of the width adjustment portion with the cross-sectional area of the first linear portion maintained equal to the cross-sectional area of each of the wires. The second linear portion is formed to follow the shape of the width adjustment portion with the cross-sectional area of the second linear portion maintained equal to the cross-sectional area of each wire.

In this configuration, the first and second linear portions of each segment conductor each have a cross section identical to the cross section of the wire and are shaped to follow the shapes of the corresponding width adjustment portions. When coils have different cross-sectional areas, rotation efficiency decreases. However, the above-described configuration improves the space factor of each slot by reducing the size of the gap between each tooth and the coil. This improves rotation efficiency.

In accordance with another aspect of the present invention, each of the wires is a circular cross-section wire.

In this configuration, the circular cross-section wires are easily deformable in any direction compared to, for example, polygonal cross-section wires. This facilitates shaping of each connecting portion, which connects the first and second linear portions to each other and is bent in a twisting manner. Also, the circular cross-section wires are less expensive than the polygonal cross-section wires, thus decreasing material costs.

In accordance with another aspect of the present invention, each wire is a polygonal cross-section wire.

In this configuration, the wires are polygonal cross-section wires. The polygonal cross-section wires each have a cross section shaped similar to the shape of the slot. Each of the polygonal cross-section wires is thus easily shaped to follow the shape of the slot compared to the circular cross-section wires. This makes it easy for the polygonal cross-section wires to, for example, improve the space factor of each slot.

In accordance with another aspect of the present invention, in the above described stator, the first linear portion has opposite circumferential end each shaped to follow the shape of the corresponding width adjustment portion. The first linear portion has opposite radial ends each shaped to extend in a direction perpendicular to the radial direction. The second linear portion has opposite circumferential ends each shaped to follow the shape of the corresponding width adjustment portion. The second linear portion has opposite radial ends each shaped to extend in the direction perpendicular to the radial direction.

In this configuration, the opposite circumferential ends of each of the first and second linear portions are shaped to follow the shapes of the corresponding width adjustment portions. The opposite radial ends of each of the first and second linear portions are shaped to extend in the direction perpendicular to the tooth radial direction. As a result, each of the linear portions has a substantially trapezoidal cross section. It is thus easy to shape the linear portions of this configuration, which have the trapezoidal cross sections, compared to, for example, a case in which the linear portions must be shaped each in a shape having non-parallel radial ends.

In accordance with another aspect of the present invention, in the above described stator, the opposite circumferential ends of the first linear portion are each shaped to follow the shape of the corresponding width adjustment portion. At least one of the opposite radial ends of the first linear portion is shaped in a manner inclined with respect to the direction perpendicular to the radial direction. The opposite circumferential ends of the second linear portion are each shaped to follow the shape of the corresponding width adjustment portion. At least one of the opposite radial ends of the second linear portion is shaped in a manner inclined with respect to the direction perpendicular to the radial direction.

In this configuration, the opposite circumferential ends of each of the first and second linear portions are shaped to follow the shapes of the corresponding width adjustment portions. At least one of the opposite radial ends of each of the first and second linear portions is shaped to be inclined with respect to the direction perpendicular to the radial direction. In this configuration, the thickness of each linear portion in the direction perpendicular to the radial direction increases only in a limited area in the linear portion, compared to a mode in which the opposite radial ends of the linear portion are not inclined. As a result, the distal ends of the first and second linear portions projected to the exterior of each slot are easily deformable in the direction perpendicular to the radial direction. This facilitates deforming the projected distal ends and then connecting the deformed distal ends to distal ends of other components, for example.

In accordance with another aspect of the present invention, in the above described stator, the thickness of each tooth in the direction perpendicular to the radial direction is defined as a tooth width. Each width adjustment portion is formed such that the tooth width becomes uniform in the radial direction.

In this configuration, each width adjustment portion is formed such that the tooth thickness in the direction perpendicular to the radial direction, which is the tooth width, becomes uniform in the radial direction. This substantially cancels variation in magnetic resistance in each tooth in the radial direction.

In accordance with another aspect of the present invention, in the above described stator, each width adjustment portion extends throughout the tooth in the radial direction.

Since each width adjustment portion radially extends throughout the associated tooth in this configuration, magnetic resistance variation in the tooth in the radial direction is decreased in the entire zone of the tooth in the radial direction.

In accordance with another aspect of the present invention, in the above described stator, each tooth has a rotor facing portion projecting circumferentially from the distal end of the tooth to face the rotor. The width adjustment portion is formed in a portion of each tooth other than the portion corresponding to the rotor facing portion.

Since each width adjustment portion radially extends throughout the associated tooth, magnetic resistance variation in the tooth in the radial direction is reduced in the entire zone in the tooth in the radial direction.

In accordance with another aspect of the present invention, in the above described stator, the segment conductors are formed using wires having identical cross sections. Each of the segment conductors is formed in a U shape and includes a first linear portion, a second linear portion, and a connecting portion for connecting the first linear portion to the second linear portion. The first linear portion extends through each slot at a circumferential position different from the circumferential position at which the second linear portion extends through the corresponding slot. The first linear portion is arranged in each slot at a radial position different from the radial position at which the second linear portion is located in the slot. Only one of the first linear portion and the second linear portion has a cross-sectional area equal to the cross-sectional area of the wire and is shaped to follow the shape of the corresponding width adjustment portion.

In this configuration, in each segment conductor, only the linear portion located at an inner position in the tooth radial direction has a cross-sectional area equal to the cross-sectional area of the wire and is shaped to follow the shapes of the corresponding width adjustment portions. When coils have different cross-sectional areas, rotation efficiency drops. However, in this configuration, the space factor of each slot is improved by those of the first and second linear portions that are located at inner positions in the radial direction. Also, wire shaping is easy in this configuration, compared to shaping a linear portion located at an outer position in the tooth radial direction.

In accordance with another aspect of the present invention, in the above described stator, the thickness of each tooth in the direction perpendicular to the radial direction is defined as a tooth width. A proximal portion of the tooth has a width increasing portion. The tooth width at the width increasing portion becomes greater toward the annular portion.

In this configuration, each width increasing portion is formed in the proximal portion of the associated tooth such that the tooth width, which is the thickness of the tooth in the direction perpendicular to the radial direction, becomes greater toward the proximal end. This decreases magnetic resistance acting on the annular portion, or, in other words, the yoke. Further, each tooth of this configuration has improved rigidity, thus preventing deformation, such as bending, of the distal end of the tooth.

In accordance with another aspect of the present invention, in the above described stator, the thickness of each tooth in the direction perpendicular to the radial direction is defined as a tooth width. A proximal portion of the tooth has a width increasing portion. The tooth width at the width increasing portion becomes greater toward the annular portion. The segment conductors are formed by wires having identical cross sections. Each of the segment conductors is formed in a U shape and includes a first linear portion, a second linear portion, and a connecting portion for connecting the first linear portion to the second linear portion. The first linear portion extends through each slot at a circumferential position different from the circumferential position at which the second linear portion extends through the corresponding slot. The first linear portion is arranged at a radially inner end in each slot. The second linear portion is located at a radially outer end in the slot. Each one of the slots accommodates a total of four linear portions aligned in the radial direction. The linear portions are any ones of the first linear portions and the second linear portions. Each width increasing portion is formed at the position corresponding to those of the linear portions located at a third position and a fourth position as counted from the radially inner end. The slot width is uniform in the radial direction at the position corresponding to each width increasing portion.

In this configuration, the width increasing portions of each tooth are formed at the positions corresponding to the second linear portions located at the third position and the fourth position counted from the inner radial end. Each of the width increasing portions is formed such that the width of the corresponding slot becomes uniform in the radial direction. Each segment conductor is shaped such that only the linear portions arranged at the first and second positions counted from the inner radial end are shaped to follow the shapes of the corresponding width adjustment portions. This decreases the size of the gap between the segment conductor and the corresponding tooth, thus improving the space factor of the slot. As a result, the advantages of the above-described configuration are brought about. That is, efficiency is improved and the segment conductors are easily shaped.

In accordance with another aspect of the present invention, a motor is provided that includes the above described stator and a consequent pole type rotor.

This configuration employs a consequent pole type rotor in which the magnetic poles, which are the north poles and the south poles, are magnetically non-equilibrated. This causes turbulence in the magnetic flux, thus hampering smooth rotation of the rotor in the motor. However, such problems are prevented in the above-described configuration.

In accordance with another aspect of the present invention, a stator including an armature core and a segment coil is provided. The armature core has an annular portion, which defines an axial direction, a radial direction, and a circumferential direction, and a plurality of teeth extending from the annular portion in the radial direction. A slot is defined between each adjacent pair of the teeth. The segment coil is configured by electrically connecting a plurality of segment conductors together. The segment conductors extend axially through the corresponding slots. The dimension of each of the teeth in a direction perpendicular to the radial direction is defined as a tooth width. Each tooth is formed such that the tooth width is uniform in the radial direction or becomes greater in the radially outward direction.

Accordingly, the present invention provides a stator and a motor having a segment coil with less radial variation of magnetic resistance in teeth.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

MODES FOR CARRYING OUT THE INVENTION

A first embodiment of the present invention will now be described with reference to FIGS. 1 to 4.

Figure 1:
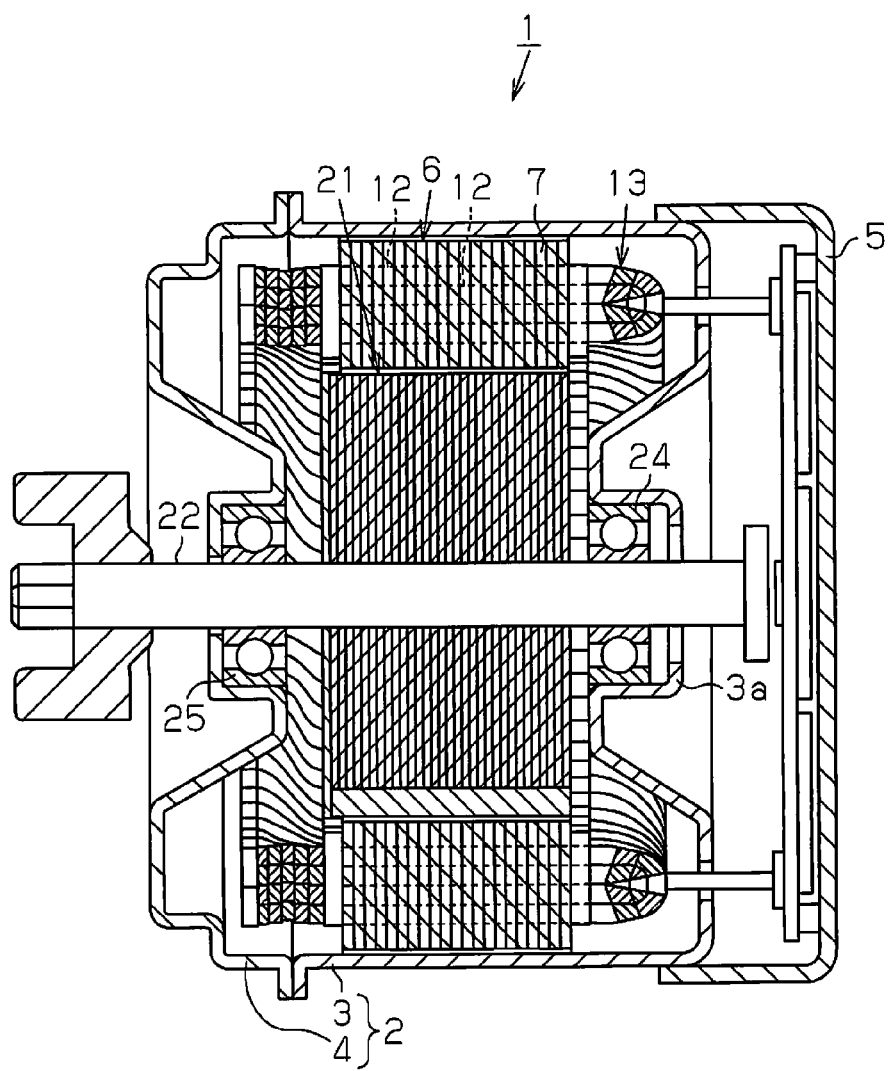
FIG. 1 is a cross-sectional view showing a motor according to a first embodiment of the present invention.

As shown in FIG. 1, a motor case 2 of an inner rotor type motor 1 includes a cylindrical housing 3 having a closed end and a front end plate 4, which closes a front opening of the housing 3. The front end of the housing 3 corresponds to the left side as viewed in FIG. 1. A circuit accommodating box 5, which accommodates a power supply circuit such as a circuit substrate, is attached to the rear end of the housing 3 from the outside. The rear end of the housing 3 corresponds to the right end of the housing 3 as viewed in FIG. 1.

Figure 2:
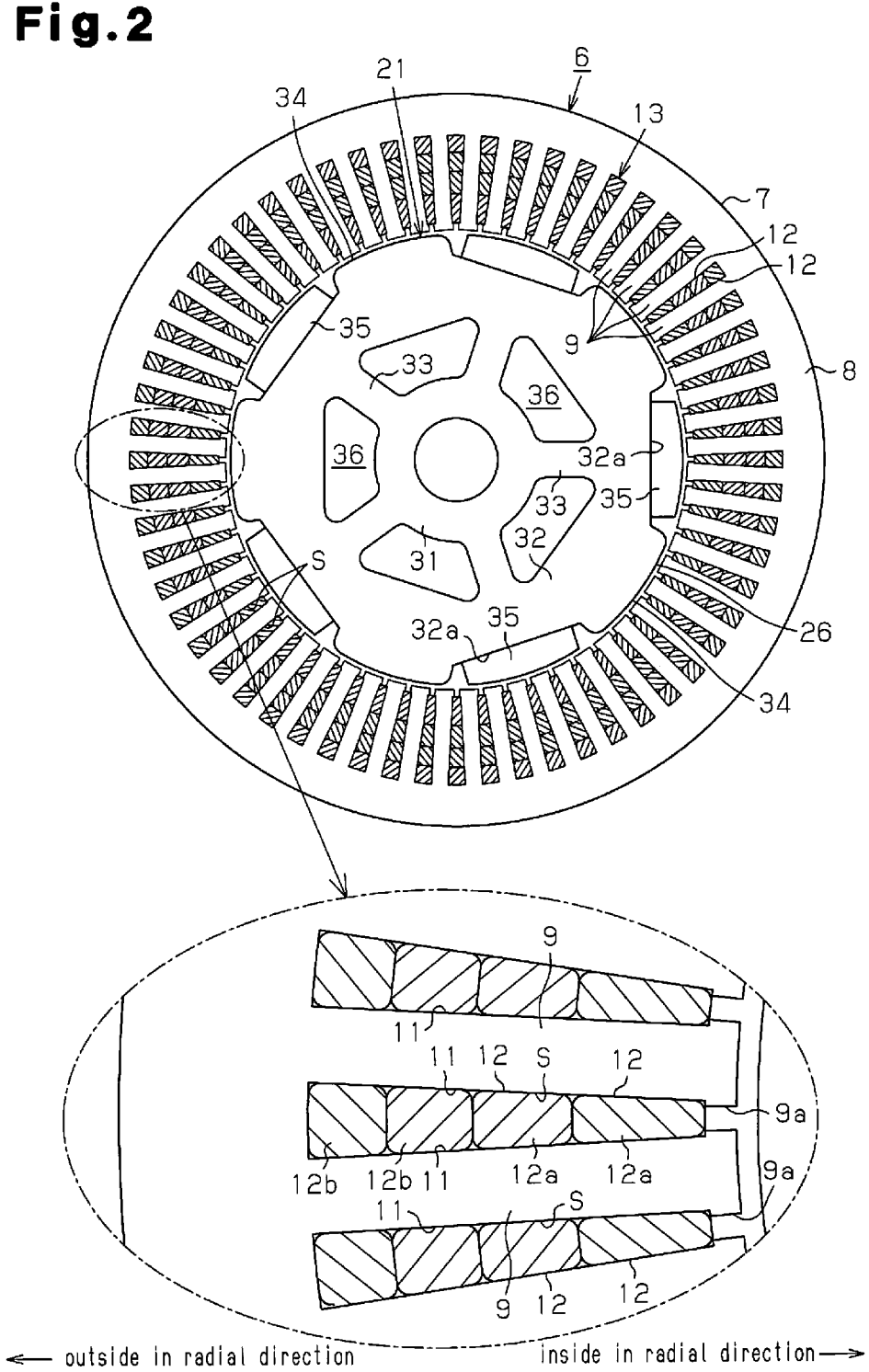
FIG. 2 is a cross-sectional view showing the stator of the first embodiment and a portion of a rotor.

A stator 6 is fixed to the inner peripheral surface of the housing 3. With reference to FIG. 2, the stator 6 has an armature core 7 serving as a stator core. The armature core 7 includes an annular portion 8 and a plurality of teeth 9, which extend radially inward from the annular portion 8 and are aligned circumferentially. In the first embodiment, sixty teeth 9 are employed. In other words, the teeth 9 form sixty slots S, each of which is arranged between the corresponding adjacent pair of the teeth 9.

As illustrated in FIG. 2, each one of the teeth 9 includes width adjustment portions 11, each of which adjusts the width of the corresponding one of the slots S. The width of each slot S in the direction perpendicular to the tooth radial direction becomes smaller radially inward direction. Specifically, the width adjustment portions 11 of the first embodiment are formed such that the tooth width, which is the thickness of each tooth 9 in the direction perpendicular to the tooth radial direction, becomes uniform in the tooth radial direction. The tooth radial direction refers to the direction of a radial line extending from the axis of the motor 1 through a given tooth 9 toward the annular portion 8 as viewed in a stator cross section perpendicular to the rotation axis of the motor 1. In the first embodiment, each one of the width adjustment portions 11 extends radially throughout the associated one of the teeth 9. Specifically, the zone occupied by each width adjustment portion 11 in the tooth 9 does not include a rotor facing portion 9a. The rotor facing portion 9a extends from the distal end of the tooth 9, which is the inner end of the tooth 9 in the tooth radial direction, projects slightly in tooth circumferential directions, and faces a rotor 21. The tooth circumferential directions refers to the directions of a circle that is concentric with the outer periphery of the stator 6, as viewed in a stator cross section, passes through the teeth 9 and is centered at the rotation axis of the motor 1. In the first embodiment, as viewed in a cross section perpendicular to the rotor axial direction, the tooth width is uniform in the tooth radial direction, except for the zone corresponding to the rotor facing portion 9a. In other words, the width of each width adjustment portion 11 in the direction perpendicular to the tooth radial direction becomes smaller in the radially inward direction. A non-illustrated insulator is mounted on an inner wall surface of each slot S.

Figure 3:
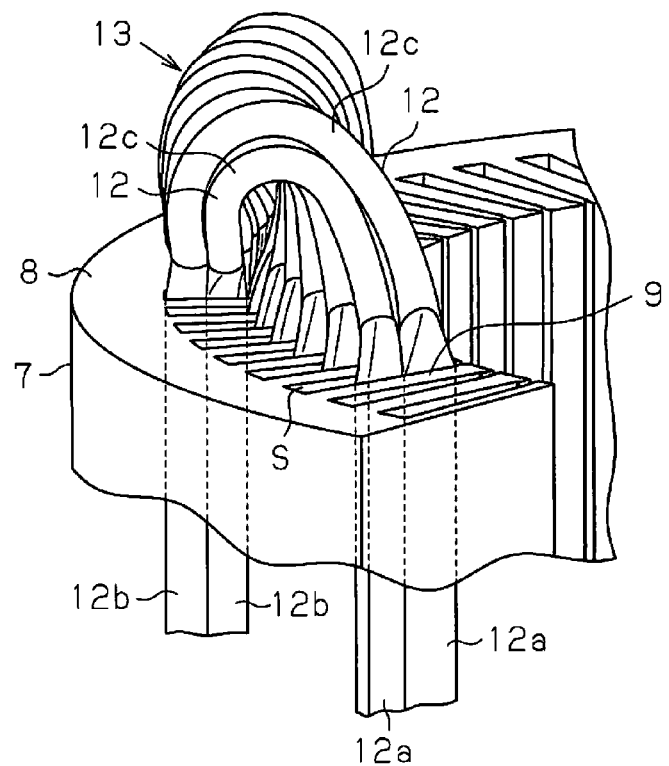
FIG. 3 is a partial perspective view showing the stator of the first embodiment.

With reference to FIGS. 1 to 3, a three-phase Y-connection segment coil 13, which are U phase, V phase, and W phase, is mounted in the armature core 7. The segment coil 13 is configured by a plurality of segment conductors 12, which are electrically connected to one another. The segment conductors 12 are formed by shaping wires having identical cross sections. As illustrated in FIG. 3, each of the segment conductors 12 is formed substantially in a U shape. The segment conductors 12 include first linear portions 12a, second linear portions 12b, and connecting portions 12c. Each of the connecting portions 12c connects the corresponding one of the first linear portions 12a to the associated one of the second linear portions 12b. The positions at which the first linear portions 12a extend through the slots S in the tooth circumferential direction are different from the positions at which the corresponding second linear portions 12b extend through the slots S in the tooth circumferential direction. The first linear portions 12a are arranged at radially inner positions in the corresponding slots S. In other words, in each of the slots S through which the first linear portions 12a are passed, the first linear portions 12a are arranged at different positions in the tooth radial direction. The second linear portions 12b are arranged at radially outer positions in each slot S. That is, in each slot S through which the second linear portions 12b are passed, the second linear portions 12b are arranged at different positions in the tooth radial direction. The first linear portion 12a arranged at the first position as counted from the inner radial end in each slot S is connected to the second linear portion 12b located at the fourth position as counted from the inner radial end in a different slot S. The first linear portion 12a at the second position as counted from the inner radial end in each slot S is connected to the second linear portion 12b at the third position as counted from the inner radial end in a different slot S.

In other words, as viewed in the tooth radial direction, the inner one of the two first linear portions 12a arranged on the inner end in a certain one of the slots S is connected to the outer one of the two second linear portions 12b located on the outer end in a different one of the slots S, which is located at a position different from the position of the other slot S in the tooth circumferential direction, through the connecting portion 12c. As viewed in the tooth radial direction, the outer one of the two first linear portions 12a arranged on the inner end in the certain slot S is connected to the inner one of the two second linear portions 12b located on the outer end in the different slot S, which is at the position different from the position of the other slot S in the tooth circumferential direction, through the connecting portion 12c.

Specifically, each of the wires used in the first embodiment is a circular cross-section wire formed by a conductor having a circular cross-section cross section, which has an insulation coating on its outer surface. In particular, the connecting portions 12c are not subjected to molding or machining, i.e., the connecting portions 12c remain as wires having circular cross sections.

As illustrated in FIG. 2, each of the first and second linear portions 12a, 12b has a cross-sectional area equal to the cross-sectional area of each of the wires and is received in the corresponding one of the slots S. The opposite circumferential ends of each of the first and second linear portions 12a, 12b, which are the opposite ends of the linear portion 12a, 12b in the tooth circumferential direction, are shaped to follow the shapes of the corresponding width adjustment portions 11. The opposite radial ends of each of the first and second linear portions 12a, 12b, which are the opposite ends of the linear portion 12a, 12b in the tooth radial direction, are shaped to extend in a direction perpendicular to the tooth radial direction. As a result, the first and second linear portions 12a, 12b each have a substantially trapezoidal cross section. Specifically, the radially inner end of the cross section corresponds to the short end of the trapezoidal shape and the radially outer end of the cross section corresponds to the long end of the trapezoidal shape. In each slot S of the stator 6 of the first embodiment, four first and second linear portions 12a, 12b are aligned in the tooth radial direction. The segment conductors 12 include a first type of conductors and a second type of conductors. Referring to FIG. 3, each of the first type of conductors includes two linear portions 12a, 12b, which are arranged at the first position and the fourth position as counted from the inner end of the slot S in the tooth radial direction. Each of the second type of conductors includes two linear portions 12a, 12b, which are located at the second position and the third position as counted from the inner end of the slot S in the tooth radial direction. The segment coil 13 is configured mainly by the above-described two types of segment conductors 12, each of which substantially has a U shape. In certain portions of the segment coil 13, such as a power supply connection terminal or a neutral point connection terminal serving as a wire end, a specific type of segment conductors, which, for example, include a single linear portion, are employed. The cross-sectional areas of the first and second linear portions 12a, 12b are equal to the cross-sectional area of each of the wires, or, in other words, equal. The width of each slot S, which is the interval between the width adjustment portions 11, becomes smaller in the radially inward direction. As a result, the dimensions of the linear portions 12a, 12b in the tooth radial direction become greater in the radially inward direction. The distal end of each of the first and second linear portions 12a, 12b passes through the corresponding slot S and projects to the exterior. The projected distal ends are deformed and bent before being electrically connected to distal ends of other components or the specific type of segment conductors through, for example, welding. The segment coil 13 is thus completed.

As illustrated in FIG. 1, the rotor 21 is fixed to a rotary shaft 22. In the first embodiment, the rotary shaft 22 is formed of non-magnetic metal. The rotary shaft 22 is rotationally supported by a bearing 24 supported by a bottom portion 3a of the housing 3 and a bearing 25 supported by the front end plate 4. The rotor 21 is arranged inside the stator 6 (the rotor facing portion 9a).

The rotor 21, which is fixed to the rotary shaft 22, is a consequent pole type rotor.

Figure 4:
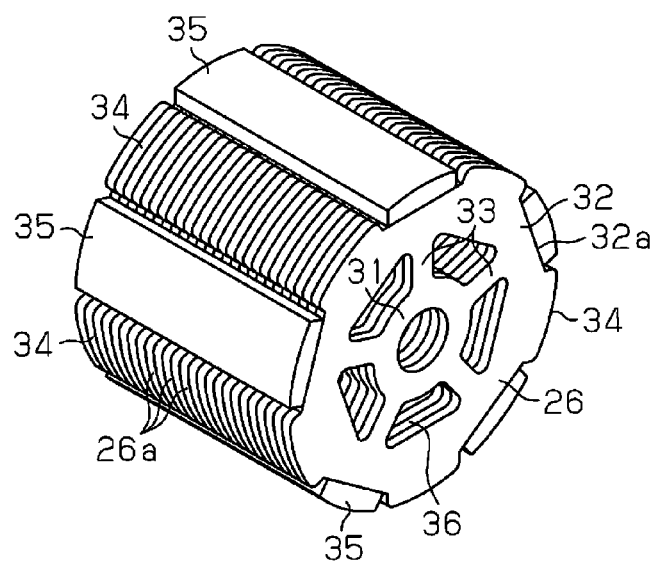
FIG. 4 is a perspective view showing the rotor of the first embodiment.

As illustrated in FIG. 4, the rotor 21 has a rotor core 26, which is configured by laminating a plurality of core sheets 26a formed by iron steel plates. The rotor core 26 is arranged around and fixed to the rotary shaft 22 (see FIG. 1).

With reference to FIGS. 2 and 4, the rotor core 26 has a shaft fixing tubular portion 31 fixed to the rotary shaft 22, a magnet fixing tubular portion 32 arranged radially outward to the shaft fixing tubular portion 31, and bridging portions 33. The shaft fixing tubular portion 31 has a cylindrical shape and is engaged with the outer peripheral surface of the rotary shaft 22. The magnet fixing tubular portion 32 is arranged around the outer peripheral surface of the shaft fixing tubular portion 31 with a uniform interval maintained between the magnet fixing tubular portion 32 and the shaft fixing tubular portion 31. The bridging portions 33 connect and hold the shaft fixing tubular portion 31 and the magnet fixing tubular portion 32 together as spaced apart at a constant interval.

Five arcuate recesses 32a are formed in the outer peripheral surface of the magnet fixing tubular portion 32 and spaced apart at equal angles in a rotor circumferential direction, extending axially throughout the outer peripheral surface of the magnet fixing tubular portion 32. The recesses 32a form five salient poles 34, each of which is arranged between the corresponding adjacent pair of the recesses 32a in the outer peripheral surface of the magnet fixing tubular portion 32.

The rotor radial direction refers to the direction extending from the rotation axis of the motor 1 toward the annular portion 8, as viewed in a rotor cross section perpendicular to the rotation axis of the motor 1. The rotor circumferential direction refers to the direction parallel to the outer periphery of the rotor 21, as viewed in the rotor cross section perpendicular to the rotation axis of the motor 1. Five magnets 35 are each fixed in the corresponding recesses 32a, which are arranged in the rotor circumferential direction. The magnets 35 are arranged in the rotor core 26 such that the inner surface of each magnet 35 in the rotor radial direction becomes a north pole and the outer surface of the magnet 35, which is comparatively close to the stator 6, in the rotor radial direction becomes a south pole. The salient poles 34 are adjacent to the corresponding magnets 35 in the rotor circumferential direction. As a result, the outer surfaces, which are close to the stator 6, of the salient poles 34 become north poles in contrast to the south poles of the outer surfaces of the magnets 35.

The number of the teeth 9 formed in the stator 6 of the first embodiment is represented by Z, which is determined in the manner described below.

When the number of magnets 35, which is the number of pole pairs, is represented by p, which is an integral number not less than two, and the number of phases in the segment coil 13 is represented by m, the number of teeth 9, which is represented by Z, is set to satisfy the expression: Z=2×p×m×n, in which n represents a natural number.

In the first embodiment, since the number of the magnets 35 is five and the number of the phases is three, the number Z of the teeth 9 is set to sixty (Z=2×5×3×2) based on the above-described expression.

The five bridging portions 33 hold the shaft fixing tubular portion 31 in a state connected to the magnet fixing tubular portion 32. The bridging portions 33 project from the outer peripheral surface of the shaft fixing tubular portion 31 and are connected to the inner peripheral surface of the magnet fixing tubular portion 32. Specifically, the bridging portions 33 are connected to the magnet fixing tubular portion 32 at the positions corresponding to the recesses 32a, in which the magnets 35 are fixed. The bridging portions 33 are arranged such that the middle position in each bridging portion 33 in the rotor circumferential direction and the middle position in the corresponding magnet 35 in the rotor circumferential direction are aligned in the same rotor radial direction, or, in other words, are the same angular positions. As a result, the space between the outer peripheral surface of the shaft fixing tubular portion 31 and the inner peripheral surface of the magnet fixing tubular portion 32 is divided into five sections by the corresponding bridging portions 33, which are arranged in the rotor circumferential direction. This forms five clearances 36, which extend in the axial direction. The specific gravity and magnetism in the clearances 36 are small compared to the rotor core 26, which is formed by the laminated iron steel plates. The clearances 36 decrease the weight of the rotor core 26, thus reducing the weight of the motor 1 as a whole.

Operation of the first embodiment, which has the above-described configuration, will hereafter be described.

In the motor 1, the power supply circuit in the circuit accommodating box 5 supplies a drive electric current to the segment coil 13. This produces a magnetic field for rotating the rotor 21 in the stator 6. The rotor 21 is thus rotated and magnetic flux is generated between each of the teeth 9 and the rotor 21.

At this stage, in the first embodiment, magnetic resistance (magnetic flux density) is prevented from becoming excessively great at a radially inner position in each tooth 9, unlike the conventional art in which the slot width is uniform in the tooth radial direction.

The first embodiment has the characteristic advantages described below.

(1) Each tooth 9 has the width adjustment portions 11 for decreasing the slot width, which is the width of the corresponding slot in the direction perpendicular to the tooth radial direction, in the radially inward direction. As a result, in the first embodiment, variation in magnetic resistance of each tooth 9 in the tooth radial direction decreases compared to, for example, the conventional technique in which the slot width is uniform in the tooth radial direction. In other words, the first embodiment decreases the radial direction dependence of the magnetic resistance compared to the conventional technique. That is, unlike the conventional technique, the first embodiment prevents the problem that smooth rotation of the rotor 21 is hampered by the magnetic resistance (the magnetic flux density) that excessively increases at an inner position in the tooth radial direction.

(2) The first and second linear portions 12a, 12b of each segment conductor 12 are each shaped to have a cross-sectional area equal to the cross-sectional area of each of the wires and follow the shapes of the corresponding width adjustment portions 11. When coils have different cross-sectional areas, rotation efficiency decreases. However, in the first embodiment, the space factor of each slot is increased by reducing the size of the gap between the tooth 9 and the coil. This improves rotation efficiency.

(3) Each segment conductor 12 is formed by shaping a circular cross-section wire. The circular cross-section wire is easily deformable in any direction compared to, for example, a polygonal cross-section wire. Each connecting portion 12c, which connects the associated first and second linear portions 12a, 12b together and is bent in a twisting manner as illustrated in FIG. 3, is easily shaped. Since circular cross-section wires are less expensive than polygonal cross-section wires, the material cost decreases.

(4) The opposite circumferential ends of each of the first and second linear portions 12a, 12b are shaped to follow the shapes of the corresponding width adjustment portions 11. The opposite radial ends of each linear portion 12a, 12b are each shaped to extend in the direction perpendicular to the tooth radial direction. The first and second linear portions 12a, 12b thus have a substantially trapezoidal cross section. It is easy to shape the first and second linear portions 12a, 12b each in a trapezoidal cross-sectional shape, compared to, for example, in a shape having non-parallel opposite radial ends.

(5) Each width adjustment portion 11 of the first embodiment is formed such that the tooth thickness in the direction perpendicular to the tooth radial direction, which is the tooth width, becomes uniform in the tooth radial direction. In other words, the width of each slot S, which is located between the corresponding adjacent pair of the teeth 9, becomes smaller in the radially inward direction. The width adjustment portion 11 thus substantially cancels variation of magnetic resistance in the tooth 9 in the tooth radial direction.

(6) Each width adjustment portion 11 extends throughout the tooth 9 in the tooth radial direction, except for the rotor facing portion 9a. The first embodiment thus decreases variation of magnetic resistance in each tooth 9 in the tooth radial direction throughout the entire zone of the tooth 9 in the tooth radial direction.

The first embodiment may be modified to the forms described below.

In the first embodiment, the opposite circumferential ends of each of the first and second linear portions 12a, 12b are shaped to follow the shapes of the corresponding width adjustment portions 11. The opposite radial ends of each linear portion 12a, 12b are shaped to extend in the direction perpendicular to the tooth radial direction. However, the present invention is not restricted to the first embodiment but may be embodied with differently shaped linear portions.

Figure 5:
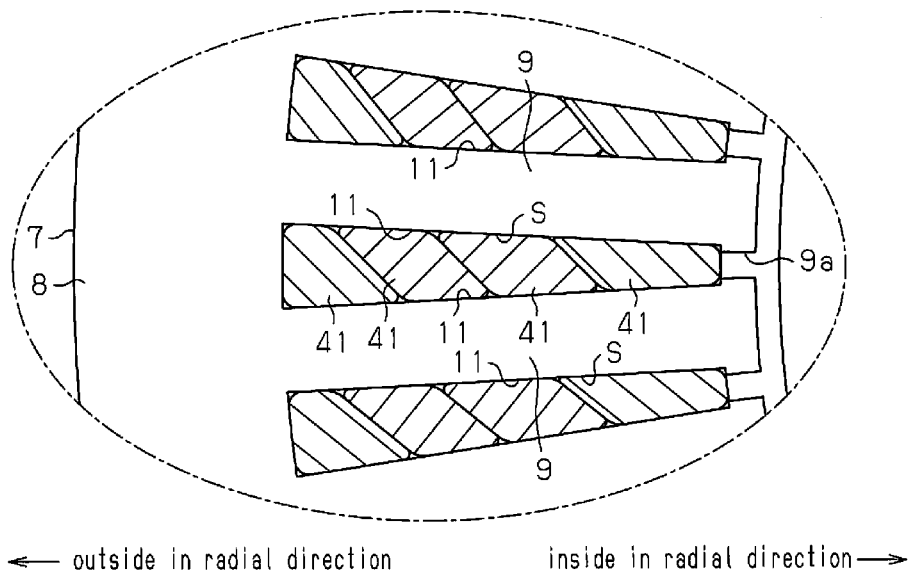
FIG. 5 is a partial enlarged diagram showing a stator according to a second embodiment of the invention.

For example, the invention may be embodied as a second embodiment, as illustrated in FIG. 5. In the second embodiment, the opposite circumferential ends of each one of linear portions 41 are shaped to follow the shapes of the corresponding width adjustment portions 11. At least one of the opposite radial ends of each linear portion 41 is shaped in a manner inclined with respect to the direction perpendicular to the tooth radial direction.

In this form, compared to the first embodiment having the linear portions 12a, 12b with non-inclined radial ends, the thickness of each linear portion 41 in the direction perpendicular to the tooth radial direction increases only in a limited area in the linear portion 41. In other words, since the linear portions 41 each have a substantially parallelogram cross section, the conductor thickness of each linear portion 41 is great in the middle portion of the parallelogram shape and small in an inner portion and an outer portion of the parallelogram shape in the tooth radial direction. The distal end of each linear portion 41 projecting from the slot S to the exterior is thus easily deformable in the direction perpendicular to the tooth radial direction. This facilitates, for example, deforming the distal ends of the linear portions 41 projected to the exteriors of the slots S and connecting the deformed distal ends to distal ends of other components.

In the first embodiment, each segment conductor 12 is formed by shaping a circular cross-section wire. However, the present invention is not restricted to use of circular cross-section wires but may employ, for example, polygonal cross-section wires. In this case, since the polygonal cross-section wires have a cross-sectional shape similar to the shape of each slot S, it is easy to shape the polygonal cross-section wires to follow the shape of the slot S, compared to the circular cross-section wires. As a result, by using the polygonal cross-section wires, the space factor of each slot S is easily enhanced.

Figure 6:
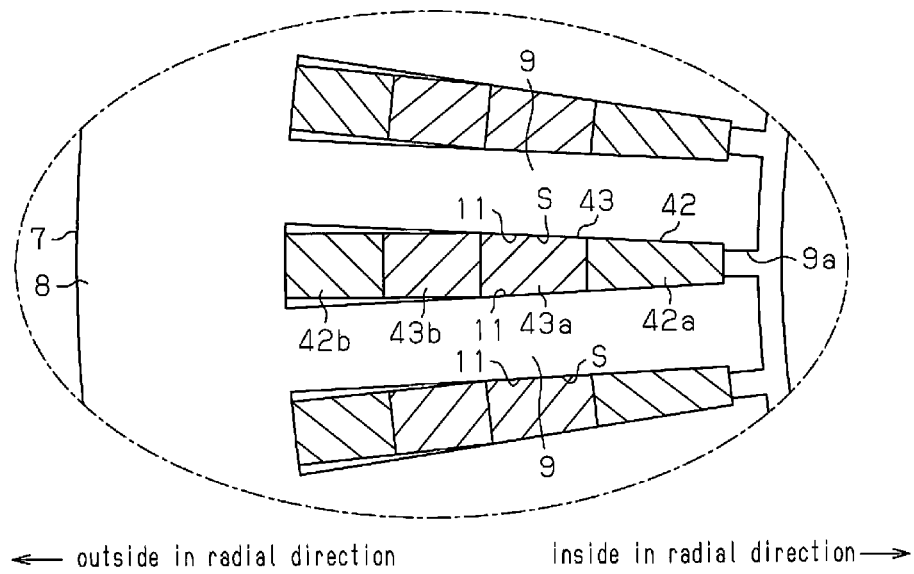
FIG. 6 is a partial enlarged diagram showing a stator according to a third embodiment of the invention.

In the first embodiment, the opposite circumferential ends of all the first and second linear portions 12a, 12b are shaped to follow the shapes of the corresponding width adjustment portions 11. However, as illustrated in FIG. 6, in a third embodiment having segment conductors 42, 43, only a linear portion 42a located at a first position and a linear portion 43a arranged at a second position as counted from the inner end in the tooth radial direction may have a cross-sectional area equal to the cross-sectional area of the wire and be shaped to follow the shapes of the corresponding width adjustment portions 11. The third embodiment employs the aforementioned polygonal cross-section wires as the wires. In other words, in the segment conductors 42, 43 of the third embodiment, a linear portion 42b and a linear portion 43b each located at an outer position in the tooth radial direction, which are the linear portion 43b at the third position and the linear portion 42b at the fourth position as counted from the inner radial end, are raw polygonal cross-section wires that have been subjected to neither shaping nor machining.

If coils have varied cross-sectional areas, rotational efficiency decreases. However, in the third embodiment, the linear portions 42a, 43a, which are located at the respective inner positions in the tooth radial direction, increase the space factor of each slot. Also, wire shaping is easy in the third embodiment compared to, for example, shaping a linear portion located at an outer position in the tooth radial direction.

In the first embodiment, each width adjustment portion 11 extends throughout the tooth 9 in the tooth radial direction except for the rotor facing portion 9a. However, the present invention is not restricted to this but may be modified in any suitable manner as long as the width adjustment portion 11 is formed in at least a portion of each tooth 9 other than the portion corresponding to the rotor facing portion 9a.

Figure 7:
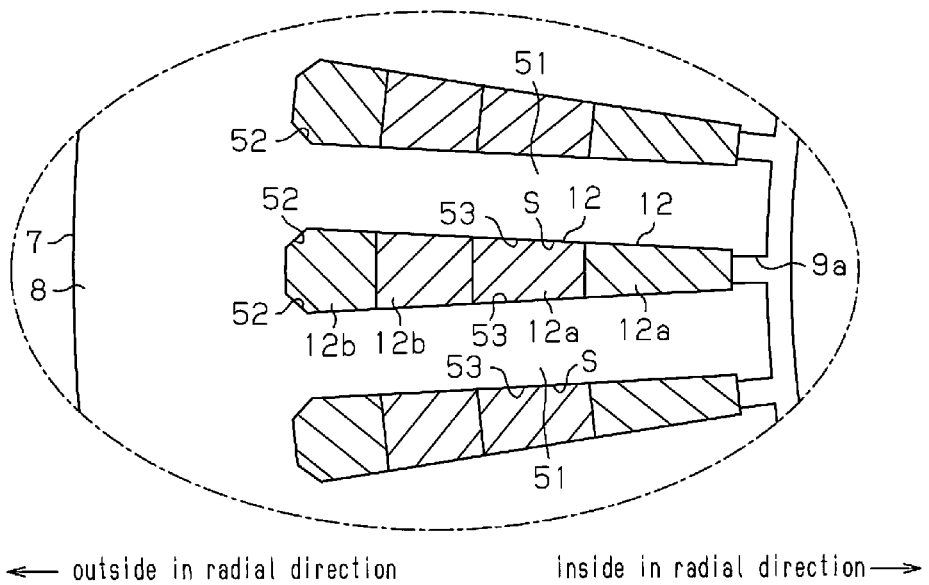
FIG. 7 is a partial enlarged diagram showing a stator according to a fourth embodiment of the invention.

For example, as illustrated in FIG. 7, a fourth embodiment has width increasing portions 52, each of which is formed in a proximal portion of a tooth 51 such that the tooth width, or, in other words, the tooth thickness in the direction perpendicular to the tooth radial direction, becomes greater toward the proximal end of the tooth 51. In other words, each width increasing portion 52 is formed in the tooth 51 such that the tooth width becomes greater toward the annular portion 8. In the fourth embodiment, the portion of each tooth 51 other than the portions corresponding to the width increasing portions 52 and the portion corresponding to the rotor facing portion 9a corresponds to width adjustment portions 53. In this embodiment, in the second linear portion 12b located at the fourth position as counted from the inner end in the tooth radial direction, each width increasing portion 52 extends from the radially outer end of the associated tooth 51 to the position corresponding to approximately one third of the length of the second linear portion 12b in the tooth radial direction. The opposite circumferential ends of each of the first and second linear portions 12a, 12b corresponding to the positions of the width adjustment portions 53 are shaped to follow the shapes of the width adjustment portions 53. The opposite circumferential ends of a radially outer portion of each second linear portion 12b at the position corresponding to the width increasing portions 52 are chamfered and shaped to follow the shapes of the width increasing portions 52.

In the fourth embodiment, magnetic resistance of the teeth 51 acting on the annular portion 8, or, in other words, a yoke decreases. Further, rigidity of each tooth 51 improves, thus preventing the distal end of the tooth 51 from being deformed, or, for example, being bent.

Figure 8:
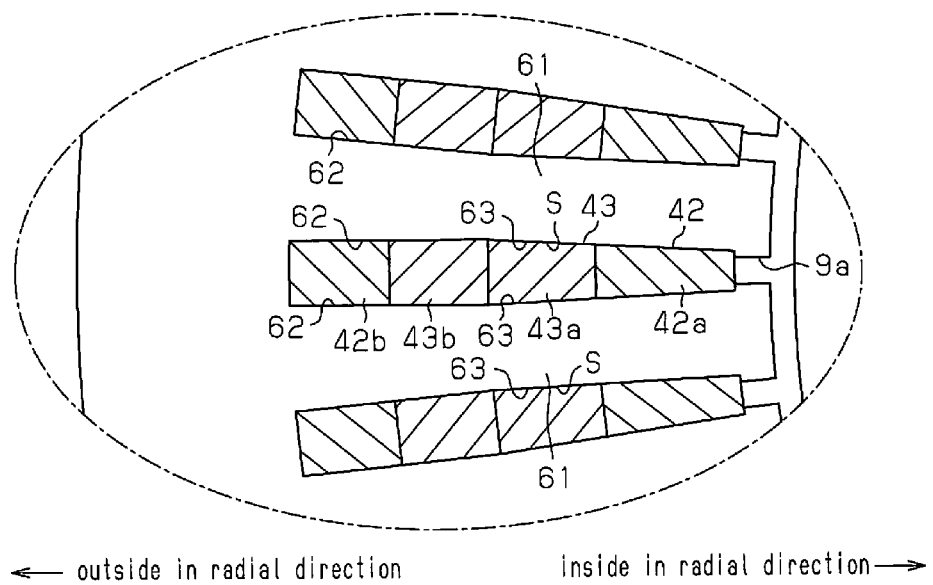
FIG. 8 is a partial enlarged diagram showing a stator according to a fifth embodiment of the invention.

The fourth embodiment illustrated in FIG. 7 may be modified to a fifth embodiment as shown in FIG. 8. In the fifth embodiment, teeth 61 each have width increasing portions 62. Each of the width increasing portions 62 is formed at a position corresponding to the linear portion 42b and the linear portion 43b located at the third position and the fourth position, respectively, as counted from the inner end in the tooth radial direction. Each width increasing portion 62 is formed such that the width of the corresponding portion of each slot S becomes uniform in the tooth radial direction. In other words, the segment conductors 42, 43 are shaped such that only the linear portion 42a and the linear portion 43a located at the first position and the second position, respectively, as counted from the inner end in the tooth radial direction, are shaped to follow the shapes of width adjustment portions 63. The size of the gap between the segment conductors 42, 43 and each tooth 61 thus decreases, thus enhancing the space factor of each slot S. Further, each of the linear portions 42b, 43b has a rectangular cross section. As a result, advantages of the fourth embodiment illustrated in FIG. 7 are ensured. That is, efficiency is improved and the segment conductors 42, 43 are easily shaped.

In the first to fourth embodiment, each width adjustment portion 11 is formed such that the thickness of the corresponding portion of the tooth 9 in the direction perpendicular to the tooth radial direction becomes uniform in the tooth radial direction. However, the present invention is not restricted to this and may include a width adjustment portion modified such that the thickness of each tooth 9 becomes non-uniform, as long as the width of each slot in the direction perpendicular to the tooth radial direction becomes smaller in the radially inward direction. For example, a width adjustment portion may be formed such that the thickness of each tooth 9 becomes slightly greater in the radially outward direction.

In the illustrated embodiments, the rotor 21 is a consequent pole type rotor. However, the invention is not restricted to this and may employ, for example, a full magnet type rotor, in which magnets are mounted for every magnetic pole.

The invention claimed is:
1. A stator comprising an armature core and a segment coil, wherein
the armature core has an annular portion, which defines an axial direction, a radial direction, and a circumferential direction, and a plurality of teeth extending from the annular portion in the radial direction, a slot being defined between teeth of adjacent pairs of teeth, the segment coil is configured by electrically connecting a plurality of segment conductors together, the segment conductors extending axially through the corresponding slots, the dimension of each slot in a direction perpendicular to the radial direction is defined as a slot width, each one of the teeth has a width adjustment portion for decreasing the slot width in the radially inward direction, the segment conductors are formed using wires having identical cross sections, each of the segment conductors is formed in a U shape and includes a first linear portion, a second linear portion, and a connecting portion for connecting the first linear portion to the second linear portion, the first linear portion extends through each slot at a circumferential position different from the circumferential position at which the second linear portion extends through the corresponding slot, the first linear portion is arranged in each slot at a radial position different from the radial position at which the second linear portion is located in the slot, the first linear portion is formed to follow the shape of the width adjustment portion with the cross-sectional area of the first linear portion maintained equal to the cross-sectional area of each of the wires, and the second linear portion is formed to follow the shape of the width adjustment portion with the cross-sectional area of the second linear portion maintained equal to the cross-sectional area of each wire.

2. The stator according to claim 1, wherein each of the wires is a circular cross- section wire.

3. The stator according to claim 1, wherein each wire is a polygonal cross- section wire.

4. The stator according to claims 1, wherein
the first linear portion has opposite circumferential end each shaped to follow the shape of the corresponding width adjustment portion,
the first linear portion has opposite radial ends each shaped to extend in a direction perpendicular to the radial direction;
the second linear portion has opposite circumferential ends each shaped to follow the shape of the corresponding width adjustment portion; and
the second linear portion has opposite radial ends each shaped to extend in the direction perpendicular to the radial direction.

5. The stator according to claim 1, wherein
the opposite circumferential ends of the first linear portion are each shaped to follow the shape of the corresponding width adjustment portion,
at least one of the opposite radial ends of the first linear portion is shaped in a manner inclined with respect to the direction perpendicular to the radial direction,
the opposite circumferential ends of the second linear portion are each shaped to follow the shape of the corresponding width adjustment portion, and
at least one of the opposite radial ends of the second linear portion is shaped in a manner inclined with respect to the direction perpendicular to the radial direction.

6. The stator according to claim 1, wherein
the thickness of each tooth in the direction perpendicular to the radial direction is defined as a tooth width, and
each width adjustment portion is formed such that the tooth width becomes uniform in the radial direction.

7. The stator according to claim 1, wherein each width adjustment portion extends throughout the tooth in the radial direction.

8. The stator according to claim 7, wherein
each tooth has a rotor facing portion projecting circumferentially from the distal end of the tooth to face the rotor, and
the width adjustment portion is formed in a portion of each tooth other than the portion corresponding to the rotor facing portion.

9. A stator comprising an armature core and a segment coil, wherein
the armature core has an annular portion, which defines an axial direction, a radial direction, and a circumferential direction, and a plurality of teeth extending from the annular portion in the radial direction, a slot being defined between teeth of adjacent pairs of teeth,
the segment coil is configured by electrically connecting a plurality of segment conductors together, the segment conductors extending axially through the corresponding slots,
the dimension of each slot in a direction perpendicular to the radial direction is defined as a slot width,
each one of the teeth has a width adjustment portion for decreasing the slot width in the radially inward direction,
the segment conductors are formed using wires having identical cross sections,
each of the segment conductors is formed in a U shape and includes a first linear portion, a second linear portion, and a connecting portion for connecting the first linear portion to the second linear portion,
the first linear portion extends through each slot at a circumferential position different from the circumferential position at which the second linear portion extends through the corresponding slot,
the first linear portion is arranged in each slot at a radial position different from the radial position at which the second linear portion is located in the slot, and
only one of the first linear portion and the second linear portion has a cross-sectional area equal to the cross-sectional area of the wire and is shaped to follow the shape of the corresponding width adjustment portion.

10. The stator according to claim 1, wherein
the thickness of each tooth in the direction perpendicular to the radial direction is defined as a tooth width,
a proximal portion of the tooth has a width increasing portion, and
the tooth width at the width increasing portion becomes greater toward the annular portion.

11. A stator comprising an armature core and a segment coil, wherein
the armature core has an annular portion, which defines an axial direction, a radial direction, and a circumferential direction, and a plurality of teeth extending from the annular portion in the radial direction, a slot being defined between teeth of adjacent pairs of teeth,
the segment coil is configured by electrically connecting a plurality of segment conductors together, the segment conductors extending axially through the corresponding slots,
the dimension of each slot in a direction perpendicular to the radial direction is defined as a slot width,
each one of the teeth has a width adjustment portion for decreasing the slot width in the radially inward direction, the thickness of each tooth in the direction perpendicular to the radial direction is defined as a tooth width, a proximal portion of the tooth has a width increasing portion, the tooth width at the width increasing portion becomes greater toward the annular portion, the segment conductors are formed by wires having identical cross sections, each of the segment conductors is formed in a U shape and includes a first linear portion, a second linear portion, and a connecting portion for connecting the first linear portion to the second linear portion, the first linear portion extends through each slot at a circumferential position different from the circumferential position at which the second linear portion extends through the corresponding slot, the first linear portion is arranged at a radially inner end in each slot, the second linear portion is located at a radially outer end in the slot, each one of the slots accommodates a total of four linear portions aligned in the radial direction, the linear portions being any ones of the first linear portions and the second linear portions, each width increasing portion is formed at the position corresponding to those of the linear portions located at a third position and a fourth position as counted from the radially inner end, and the slot width is uniform in the radial direction at the position corresponding to each width increasing portion.

12. A motor comprising:
the stator according to claim 1; and
a consequent pole type rotor.

13. A motor comprising:
the stator according to claim 9; and
a consequent pole type rotor.

14. A motor comprising:
the stator according to claim 11; and
a consequent pole type rotor.

* * * * *